United States Patent [19]

Sekiguchi

[11] Patent Number: 5,144,628
[45] Date of Patent: Sep. 1, 1992

[54] MICROPROGRAM CONTROLLER IN DATA PROCESSING APPARATUS

[75] Inventor: Sunao Sekiguchi, Tokyo, Japan

[73] Assignee: NEC Corporation, Tokyo, Japan

[21] Appl. No.: 416,977

[22] Filed: Oct. 4, 1989

[30] Foreign Application Priority Data

Oct. 5, 1988 [JP] Japan .............................. 63-249990
Oct. 12, 1988 [JP] Japan .............................. 63-256856

[51] Int. Cl.$^5$ ............................................. G06F 11/10
[52] U.S. Cl. ................................................... 371/40.1
[58] Field of Search ................... 371/40.1, 40.2, 40.4, 371/51.1, 13, 21.1; 364/200, 900

[56] References Cited

U.S. PATENT DOCUMENTS

| | | | |
|---|---|---|---|
| 4,204,634 | 5/1980 | Barsuhn | 371/40.1 |
| 4,521,872 | 6/1985 | Sawada | 371/40.1 X |
| 4,701,915 | 10/1987 | Kitamura | 371/13 |
| 4,866,718 | 9/1989 | Fosdick | 371/40.1 |
| 4,918,695 | 4/1990 | Scheuneman | 371/40.1 X |
| 4,955,023 | 9/1990 | Tanimoto | 371/40.1 |

OTHER PUBLICATIONS

Hellerman et al., "Computer System Performance", McGraw-Hill Book Company, 1975, pp. 146-149.

*Primary Examiner*—Robert W. Beausoliel
*Attorney, Agent, or Firm*—Foley & Lardner

[57] ABSTRACT

A microprogram controller in a data processing apparatus includes a control storage device which has ECC bits and tri-state input/output pins, a first register for holding microprogram data read out from the control storage device and all the bits of the ECC data, an error detection/correction circuit for performing an ECC check operation on the basis of an output value of the first register and correcting a correctable error, second to Nth registers for holding only some bits of the microprogram data read out from the control storage device, and a data bus for connecting the control storage device, an input and an output of the first register, and inputs of the second to Nth registers. When a correctable error is detected on the basis of the output value of the first register, data corrected by the error detection/correction circuit is sent onto the data bus, and the second to Nth registers fetch the corrected data from the data bus.

2 Claims, 6 Drawing Sheets

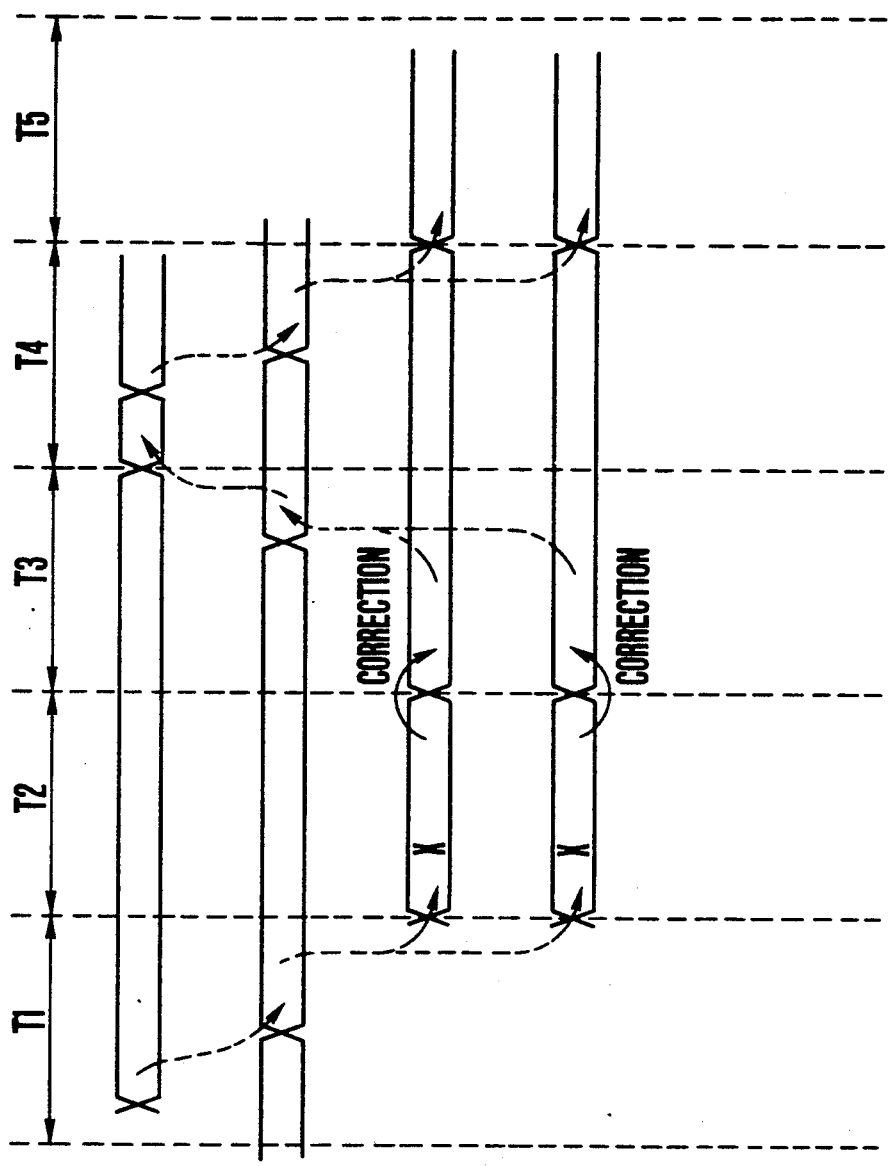

MICROPROGRAM CONTROLLER IN DATA PROCESSING APPARATUS

BACKGROUND OF THE INVENTION

The present invention relates to a microprogram-controlled data processing apparatus and, more particularly, to a 1-bit error detection/correction when microprogram read registers are dispersed.

A microprogram controller of this type includes only one microprogram read register, and has an arrangement, as shown in FIG. 5.

In FIG. 5, reference numeral 1 denotes a control storage device (CS) which holds a microprogram including an ECC (error correcting code) bit and has tri-state I/O pins. The CS 1 comprises a RAM which performs read/write access using a common data line. Reference numeral 2 denotes a 64-bit microprogram read register (RD); 3, an ECC register for holding an 8-bit ECC read out from the CS 1 together with the microprogram; and 4, an error detection/correction circuit for performing an ECC checking operation based on values in the microprogram read register 2 and the ECC register 3 and correcting a 1-bit error. A signal line L1 is a CS bus as a bidirectional data bus among the microprogram read register 2, the ECC register 3, and the CS 1. Reference symbol A denotes a unit comprising the microprogram read register 2, the ECC register 3, and the error detection/correction unit 4.

An operation when a 1-bit error is detected from data read out from the CS 1 by the microprogram read register 2 and the ECC register 3 will be described below with reference to the timing charts of FIGS. 6a to 6d. Data read out from the CS 1 is sent to the microprogram read register 2 and the ECC register 3 (FIGS. 6a and 6b in a period T1). If there is a 1-bit error in readout data (FIGS. 6c and 6d in a period T2), this error is detected upon operation of the error detection/correction circuit 4. In the next clock cycle (period T3), corrected data is stored in the microprogram read register 2 and the ECC register 3. In the next clock cycle (period T4), the corrected data is rewritten in the CS 1.

The conventional microprogram controller described above includes only one microprogram read register 2 in the unit A. Since the clock cycle of the data processing apparatus of this type is extremely shortened to allow high-speed access, when an output from the single microprogram read register is distributed to a plurality of units and is executed, a delay time occurs, and processing cannot be executed in time. Conventionally, portions of the microprogram read register are provided in units other than the unit A, as needed.

However, in this case, when a 1-bit error is detected by the unit A, the microprogram read registers having only some bits in other units must be corrected. In order to correct the microprogram read registers in other units, correction ECC bits must be provided to other units or a new bus for supplying correction data to other units must be arranged, resulting in an increase in a hardware volume and the number of signal lines.

SUMMARY OF THE INVENTION

It is an object of the present invention to provide a microprogram controller in a data processing apparatus in which, when at least a portion of a readout microprogram is distributed to a plurality of units, a 1-bit error correction of data distributed to respective units can be performed without arranging an extra signal line.

In order to achieve the above object, according to the present invention, there is provided a microprogram controller in a data processing apparatus, comprising a control storage device which has ECC bits and tri-state input/output pins, a first register for holding microprogram data read out from the control storage device and all the bits of the ECC data, error detection/correction means for performing an ECC check operation on the basis of an output value of the first register and correcting a correctable error, second to Nth registers for holding only some bits of the microprogram data read out from the control storage device, and a data bus for connecting the control storage device, an input and an output of the first register, and inputs of the second to Nth registers, wherein when the correctable error is detected on the basis of the output value of the first register, data corrected by the error detection/correction means is sent onto the data bus, and the second to Nth registers fetch the corrected data from the data bus.

In the microprogram controller according to the present invention, a 1-bit error of microprogram registers of all the units can be corrected without arranging an extra signal line.

BRIEF DESCRIPTION OF THE DRAWINGS

FIGS. 6a to 6d are timing charts for explaining the operation of the controller shown in FIG. 5.

DESCRIPTION OF THE PREFERRED EMBODIMENTS

Preferred embodiments of the present invention will now be described with reference to the accompanying drawings.

Figure 1:
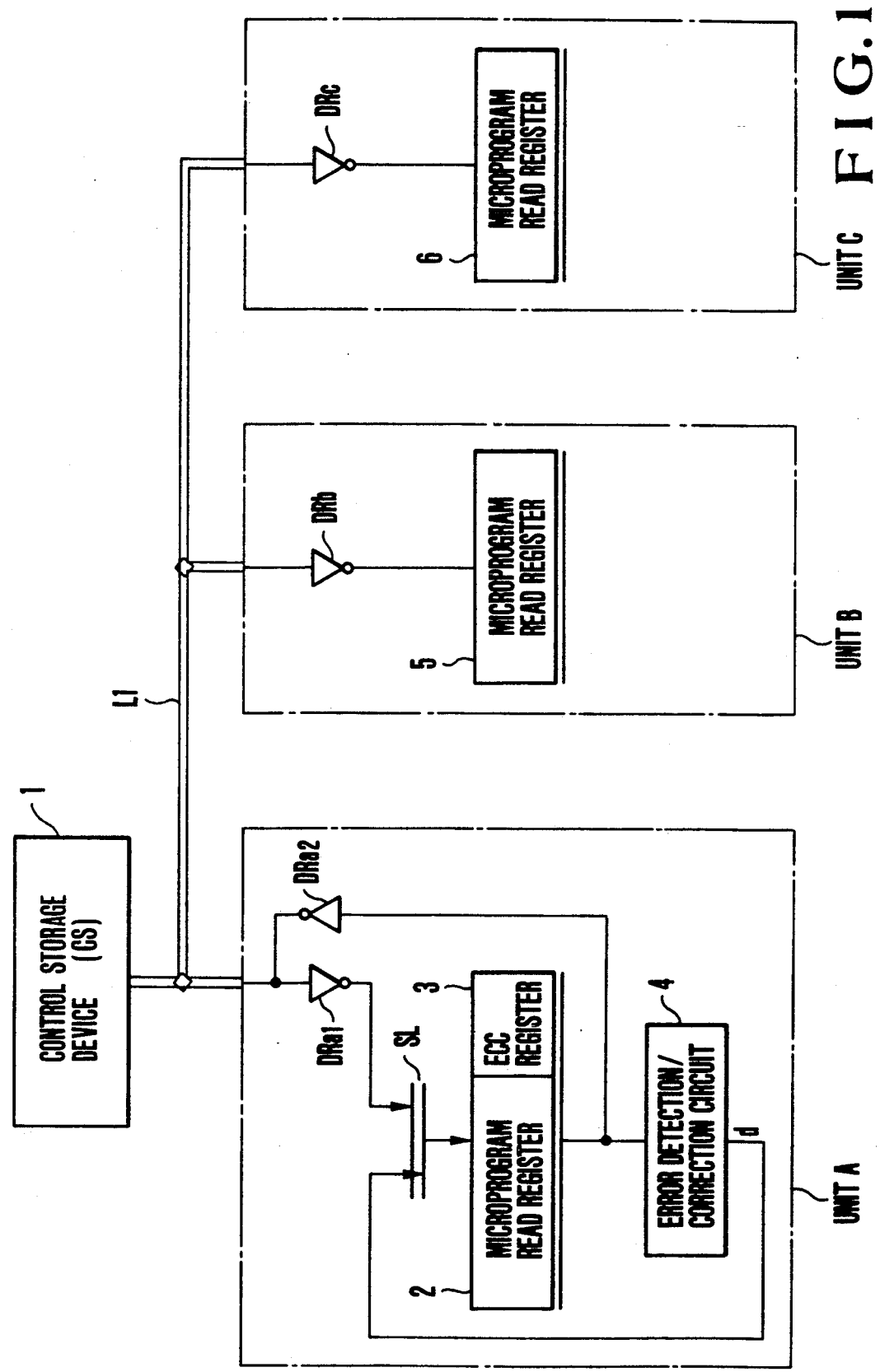
FIG. 1 is a block diagram showing an embodiment of a microprogram controller according to the present invention.
Figure 5:
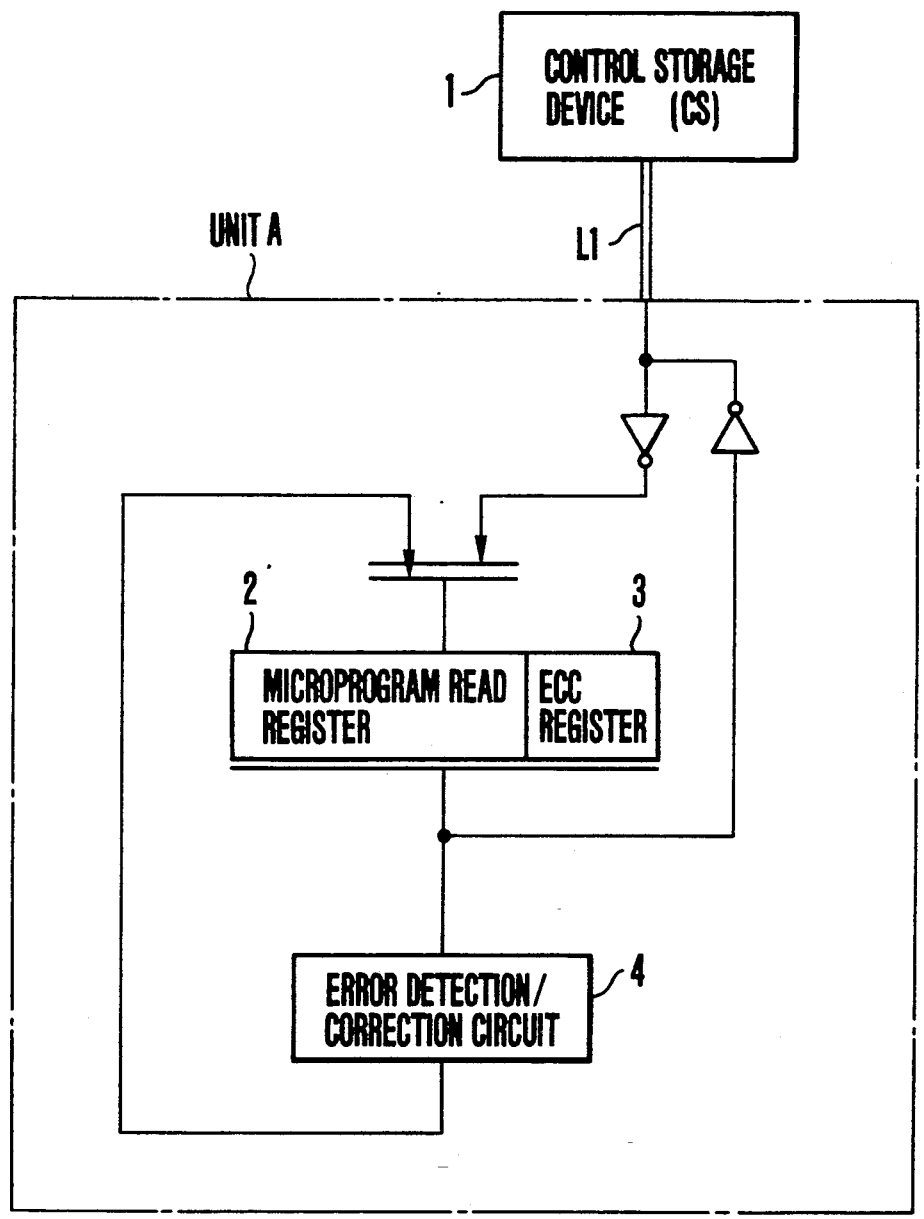
FIG. 5 is a block diagram showing a conventional microprogram controller.

FIG. 1 is a block diagram showing an embodiment of a microprogram controller according to the present invention. In FIG. 1, reference numeral 5 denotes a microprogram read register arranged in a unit B. The microprogram read register 5 does not have all the bits read out from a control storage device (CS) 1, but has bits necessary for the unit B (e.g., bits "0" to "31"). The register 5 sets a value of a CS bus L1 every clock. Reference numeral 6 denotes a microprogram read register arranged in a unit C. The microprogram read register 6 does not have all the bits read out from the CS 1, but has bits necessary for the unit C (e.g., bits "20" to "45"). The register 6 sets a value of the CS bus L1 every clock. Reference symbol SL denotes a selector; and $DR_{a1}$, $DR_{a2}$, $DR_b$, and $DR_c$, drivers. Note that the same reference numerals in FIG. 1 denote the same parts as in FIG. 5.

Figure 2:
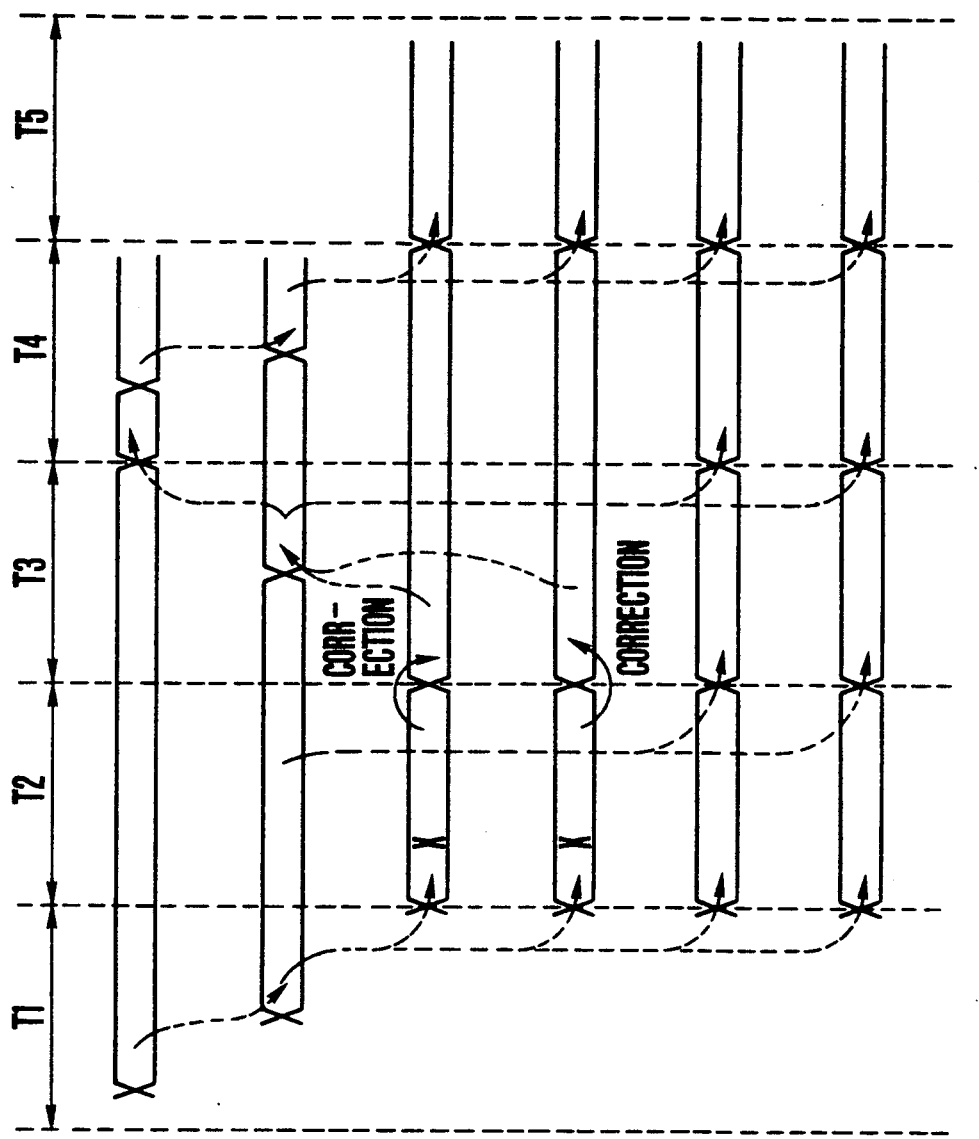
FIGS. 2a to 2f are timing charts for explaining an operation of the controller shown in FIG. 1.

The operation of the controller shown in FIG. 1 will be described below with reference to the timing charts of FIGS. 2a to 2f. The CS 1 has ECC bits and tri-state I/O pins, as described above. Data read out from the CS1 (FIGS. 2a and 2b in a period T1) is set in a microprogram read register 2 and an ECC register 3 in a unit A through the CS bus L1, the driver $DR_{a1}$, and the selector SL. At the same time, the data is set in the microprogram read registers 5 and 6 in the units B and C through the CS bus L1 and the drivers $DR_b$ and $DR_c$ (FIGS. 2c to 2f in a period T2). An error detection/correction circuit 4 performs an ECC checking operation on the basis of output values of the microprogram read register 2 and the ECC register 3. If a 1-bit error is detected, data is corrected, and the corrected data is written in the microprogram read register 2 and the ECC register 3 as an output value d through the selector SL (FIGS. 2c and 2d in a period T3). The values of the microprogram read register 2 and the ECC register 3 are output onto the CS bus L1 through the driver $DR_{a2}$ (FIG. 2b in the period T3), and are rewritten in the CS 1. At the same time, the corrected microprogram data is set in the microprogram read registers 5 and 6 through the drivers $DR_b$ and $DR_c$ (FIGS. 2a, 2e, and 2f in a period T4).

In this embodiment, the two units B and C comprise the microprogram read registers in addition to the unit A. However, the number of units excluding the unit A is not limited to this. The present invention can be applied to an arbitrary number of units.

With the above arrangement, since corrected data is transferred using an existing data bus to correct data in all the units, a 1-bit error of the microprogram read registers of all the units can be corrected without arranging an extra signal line.

Figure 3:
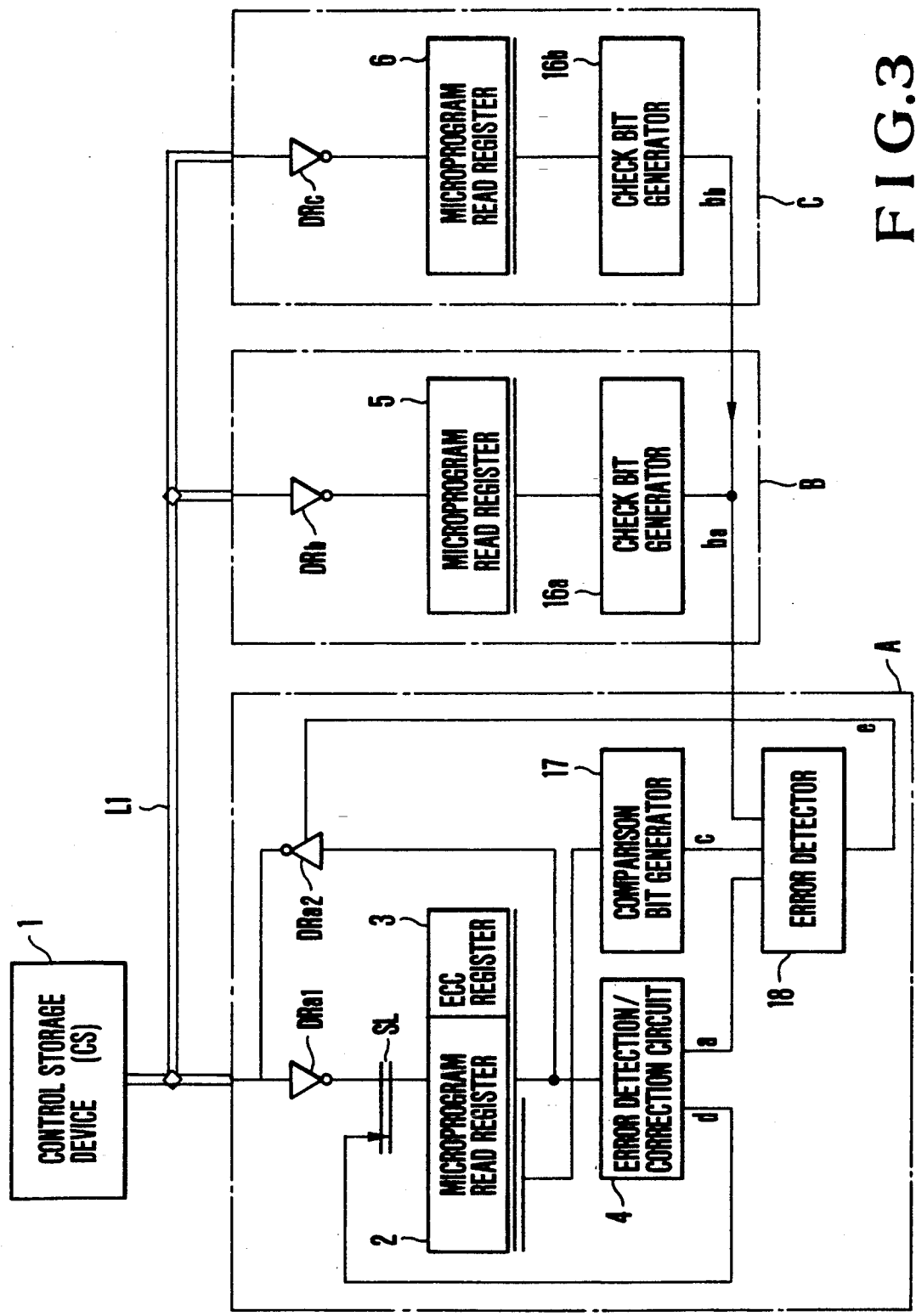
FIG. 3 is a block diagram showing another embodiment of the present invention.

FIG. 3 is a block diagram showing another embodiment of a microprogram error correction circuit according to the present invention. The same reference numerals in FIG. 3 denote the same parts as in FIGS. 1 and 5. In FIG. 3, reference numerals 16a and 16b denote check bit generators for exclusively ORing corresponding bits of output data (32-bit data in this embodiment) from microprogram read registers 5 and 6; 17, a comparison bit generator for exclusively ORing 32 bits, i.e., bits "0" to "31" of the output data from a microprogram read register 2; and 18, an error detector for detecting an error of the microprogram read register 5. Note that an error detection/correction circuit 4 performs an error checking operation using outputs from the microprogram read register 2 and an ECC register 3 as in FIG. 1. When an error is detected, the circuit 4 outputs an RD error signal a to the error detector 18. When a 1-bit error is detected, the circuit 4 corrects this error, and supplies the corrected value as an output d to the microprogram read register 2 and the ECC register 3 through a selector SL.

A 64-bit microprogram and an 8-bit ECC read out from a control storage device (CS) 1 are set in the microprogram read register 2 and the ECC register 3 in a unit A. At the same time, 32 bits of the microprogram data, i.e., bits "0" to "31" are also set in the microprogram read registers 5 and 6 of units B and C.

Output data (32-bit data) from the microprogram read registers 5 and 6 are input to the check bit generators 16a and 16b, respectively, to be exclusively ORed, thereby generating 1-bit signals ba and bb. The signals ba and bb are input to the error detector 18.

On the other hand, of the output data of the microprogram read register 2, bits "0" to "31" (32-bit data) which are the same as those stored in the microprogram read registers 5 and 6 are input to the comparison bit generator 17 to be exclusively ORed as in the check bit generators 16a and 16b, thereby generating a 1-bit signal c. The signal c is input to the error detector 18.

All the bits of the microprogram read register 2 and the ECC register 3 are input to the error detection/correction circuit 4 to perform an error checking operation of the entire microprogram read register 2. Thus, the RD error signal a indicating the presence/absence of an error is input to the error detector 18.

The error detector 18 checks a coincidence between the check bit signals ba and bb and the comparison bit signal c. When the check result indicates a noncoincidence and the RD error signal a of the microprogram read register 2 indicates the absence of an error, i.e., when errors of the microprogram read registers 5 and 6 are detected, an enable signal e is output so that the output data of the microprogram read register 2 is output onto a CS bus L1.

This state is shown in FIGS. 4a to 4e.

Figure 4:
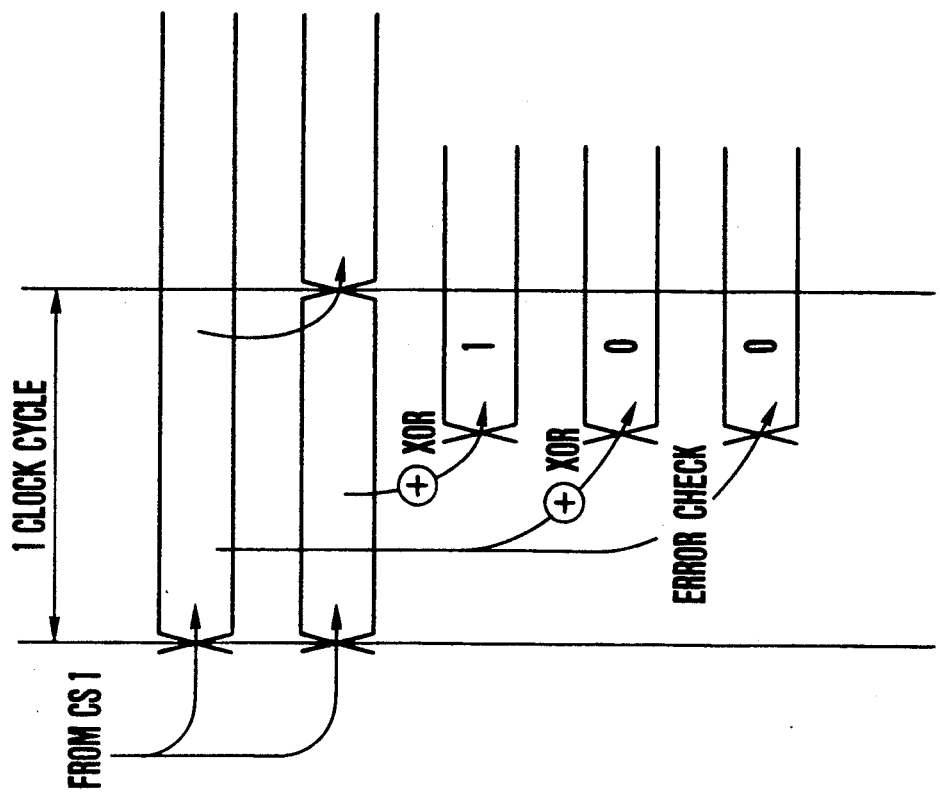
FIGS. 4a to 4e are timing charts for explaining the operation of the embodiment shown in FIG. 3.

In a given clock cycle, the CS 1 inputs data to the microprogram read registers 2, 5, and 6. This state is shown in FIGS. 4a and 4b. The comparison bit generator 17 and the check bit generators 16a and 16b respectively generate the comparison bit signal c and the check bit signals ba and bb. The error detection/correction circuit 4 performs an error checking operation. Assume that the error detection/correction circuit 4 does not detect any error and outputs "0" as the signal a, as shown in FIG. 4e, the comparison bit generator 17 outputs "0" as the signal c, and one of the check bit generators 16a and 16b outputs "1". In this case, the error detector 18 supplies the enable signal e to a driver $DR_{a2}$.

The microprogram read registers 5 and 6 are loaded with correct microprogram data in the microprogram read register 2 from the CS bus L1 in response to the next clock, as shown in FIGS. 4a and 4b.

As described above, according to this embodiment, when data of a microprogram read register which holds all the bits is correct and an error occurs in a microprogram read register which holds only some bits, correct data is sent between the microprogram read registers which are connected through a data bus, thus correcting the error.

What is claimed is:

1. A microprogram controller in a data processing apparatus, comprising:
    a control storage device which has ECC data for permitting error detection and correction and tri-state input/output pins;
    a first register for holding microprogram data read out from said control storage device and all the bits of the ECC data;
    error detection/correction means for performing an ECC check operation on the basis of an output value of said first register and correcting a correctable error;
    second to Nth registers for holding a predetermined number of bits of the microprogram data read out from said control storage device; and
    a data bus directly connected to said control storage device, and input and an output of said first register, and inputs of said second to Nth registers,
    wherein when the correctable error is detected on the basis of the output value of said first register, data corrected by said error detection/correction means is sent onto said data bus, and said second to Nth registers simultaneously fetch the corrected data from said data bus.

2. A controller according to claim 1, further comprising:
check bit generating means for generating a check bit on the basis of an output value of at least said second register of said second to Nth registers;
comparison bit generating means for generating a comparison bit in the same logic as that of said check bit generating means using bits of the output value of said first register, which are held in said second register;
error detection means for checking a coincidence between output values of said check bit generating means and said comparison bit generating means, and for, when a noncoincidence is determined and said error detection/correction means determines that no error occurs in said first register, determining data of said second register as an error; and
means for, when said error detection means detects an error, outputting the output value of said first register onto said data bus, and
wherein said second register is loaded with the output value of said first register output onto said data bus as correct data.

* * * * *